United States Patent [19]

Walba et al.

[11] Patent Number: 4,695,650
[45] Date of Patent: Sep. 22, 1987

[54] LIQUID CRYSTAL COMPOUNDS AND COMPOSITIONS CONTAINING SAME

[75] Inventors: David M. Walba; Homaune A. Razavi, both of Boulder, Colo.

[73] Assignee: University of Colorado Foundation, Boulder, Colo.

[21] Appl. No.: 911,096

[22] Filed: Sep. 24, 1986

[51] Int. Cl.[4] .................... C07C 69/76; C09K 19/20
[52] U.S. Cl. .................... 560/109; 252/299.01; 252/299.5; 252/299.65; 252/299.67; 350/350 S
[58] Field of Search .................... 350/350 R, 350 S; 252/299.01, 299.67, 299.65, 299.64, 299.5; 560/109

[56] References Cited

U.S. PATENT DOCUMENTS

| | | | |
|---|---|---|---|
| 4,149,413 | 4/1979 | Gray et al. | 252/299.67 |
| 4,576,702 | 3/1986 | Isogai et al. | 252/299.67 |
| 4,592,858 | 6/1986 | Higuchi et al. | 252/299.66 |
| 4,613,209 | 9/1986 | Goodby et al. | 252/299.67 |
| 4,614,609 | 9/1986 | Inoue et al. | 252/299.66 |

FOREIGN PATENT DOCUMENTS

| | | | |
|---|---|---|---|
| 164814 | 12/1985 | European Pat. Off. | 252/299.65 |
| 191600 | 8/1986 | European Pat. Off. | 252/299.67 |
| 194659 | 9/1986 | European Pat. Off. | 252/299.67 |
| 53-88677 | 8/1978 | Japan | 252/299.67 |

OTHER PUBLICATIONS

Goodby, J. W., et al., Liquid Crystals and Ordered Fluids, vol. 4, Griffin, A.C., et al., Ed., Plenum Press, N.Y., pp. 1-32 (1984).

*Primary Examiner*—Teddy S. Gron
*Attorney, Agent, or Firm*—Cushman, Darby & Cushman

[57] ABSTRACT

Liquid crystals having the general formula:

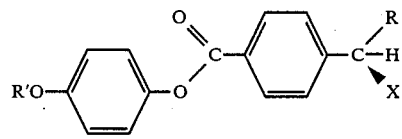

wherein R is an alkyl group of three to twelve carbon atoms, R' is an alkyl of five to twelve carbon atoms, and X is a chlorine atom or a fluorine atom. Preferred alkyl groups for R' are octyl. The compounds are particularly useful in mixtures with other liquid crystal compounds in which they exhibit synergistic effects.

6 Claims, No Drawings

LIQUID CRYSTAL COMPOUNDS AND COMPOSITIONS CONTAINING SAME

This invention was made with partial support of the U.S. Government under Grant No. DMR-82-19529 awarded by the National Science Foundation. The U.S. Government has certain rights in this invention. International Business Machines (IBM) also provided partial support for this work under IBM Award Number 518216, and IBM has certain rights in this invention.

The present invention relates to ferroelectric liquid crystals useful in electro-optical and display device applications.

BACKGROUND OF THE INVENTION

Liquid crystals have found use in a variety of electro-optical and display device applications, in particular those which require compact, energy-efficient, voltage-controlled light valves such as watch and calculator displays. These devices are based upon the dielectric alignment effects in nematic, cholesteric and smectic phases of the liquid crystal compound in which, by virtue of dielectric anisotropy, the average molecular long axis of the compound takes up a preferred orientation in an applied electric field. Since the coupling to an applied electric field by this mechanism is rather weak, the resultant electro-optical response time may be too slow for many potential applications.

Liquid crystal displays have a number of unique characteristics, including low voltage and low power of operation, which makes them perhaps the most promising of the nonemissive electro-optical display candidates available with today's technology. However, slow response and insufficient non-linearity can impose limitations for many potential applications. The requirement for speed may become especially important in proportion to the number of elements which have to be addressed in a device. This may result in increasingly impractical production costs for the potential use of such devices in flat-panel displays for use in video terminals, oscilloscopes, radar and television screens.

It has been shown by N.A. Clark and S.T. Lagewall in Appl. Phys. Lett. 36:899 (1980) and in U.S. Pat. No. 4,367,924 that electro-optic effects with sub-microsecond switching speeds are achievable using the technology of ferroelectric liquid crystals. Some ferroelectric liquid crystal display structures, in addition to the high speed (about one thousand times faster than currently used twisted nematic devices) reported by these investigators, exhibit bistable, threshold sensitive switching, making them potential candidates for matrix addressed light valves containing a large number of elements for passive displays of graphic and pictorial information, as well as for optical processing applications.

A basic requirement for application of ferroelectric liquid crystals in such devices is the availability of chemically stable liquid crystal compounds which exhibit ferroelectric phases over a substantial temperature range about room temperature. Ideally, these compounds, which must be chirally asymmetric to be ferroelectric, would exhibit a large ferroelectric dipole density, (P) in order to optimize coupling to an applied electric field, a low orientational viscosity ($\eta$) in order to optimize response times, and chemical and photochemical stability.

U.S. Pat. No. 4,556,727 discloses chirally asymmetric liquid crystal compounds formed by the incorporation of enantiomerically enriched tail units derived from readily available and inexpensive ethyl lactate into a liquid crystal molecular framework. More specifically, that patent discloses that the attachment of an enantiomerically enriched lactic acid derived tail unit to the para position of the phenyl group of a phenyl benzoate core unit will confer the desired properties of large ferroelectric dipole density and low orientational viscosity to a chirally asymmetric liquid crystal compound. The disclosure of that patent relates to ferroelectric smectic liquid crystals of the following general formula:

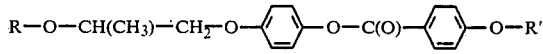

wherein R is a lower alkyl group containing one to three carbon atoms.

U.S. patent application of Walba and Vohra, Ser. No. 782,348, filed Oct. 1, 1985, now U.S. Pat. No. 4,638,073, discloses ferroelectric (chiral) smectic liquid crystal compounds having an achiral core and chiral tail units derived from (2,3)-epoxyalkyloxiranemethanols which possess a high ferroelectric polarization density. The ferroelectric crystals have the following general formulas:

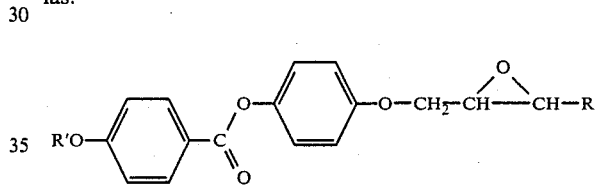

and

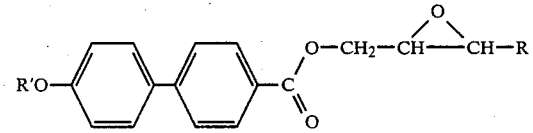

U.S. application of Walba and Eidman, Ser. No. 880,851, filed July 1, 1986, discloses chirally asymmetric liquid crystals possessing the phenyl benzoate core unit and 1-cyanoalkoxy chiral tails.

While useful liquid crystal materials have thus been reported, optimum response times have not been achieved. This is partly because of the relatively low ferroelectric polarization densities of many known materials.

SUMMARY OF THE INVENTION

It is an object of the present invention to provide a class of chirally asymmetric liquid crystals which impart the property of high dipole density upon very low polarization materials when mixed with such materials. This property makes the new liquid crystals of this invention useful as components of ferroelectric liquid crystal mixtures.

The chirally asymmetric liquid crystal compounds of the present invention are formed by incorporation of an enantiomerically enriched 1 haloalkyl unit into the tail of a p'-alkoxyphenyl-p-alkylbenzoate liquid crystal molecular structure. More specifically, attachment of an enantiomerically enriched 1-haloalkyl unit to the para position of the benzoate group of a phenylbenzoate core unit will confer the desired property of a high dipole density to the chirally asymmetric liquid crystal compounds.

DETAILED DESCRIPTION OF PREFERRED EMBODIMENTS

The liquid crystals of the present invention have the general formula:

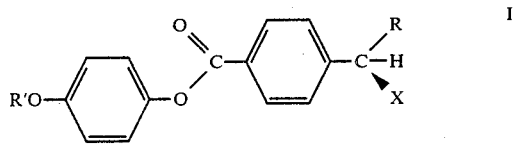

wherein R is an alkyl group of three to twelve carbon atoms, R' is an alkyl of five to twelve carbon atoms, and X is a chlorine atom or a fluorine atom. Preferred alkyl groups for R' are n-decyl. Preferred alkyl groups for R are n-octyl.

The liquid crystal compounds of the present invention are prepared according to the following sequence of reactions:

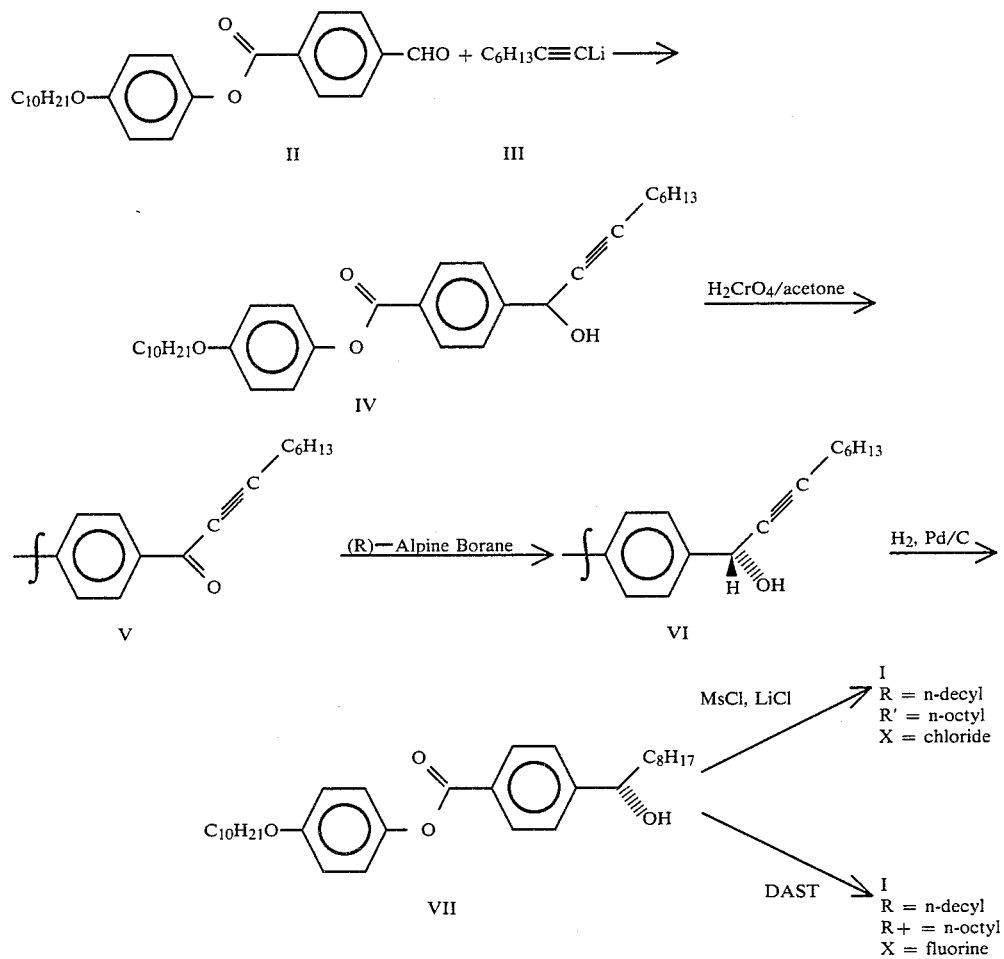

In general terms, compounds of Formula I are prepared by first preparing an aldehyde II by esterification of, e.g., p-decyloxybenzoyl chloride with p-hydroxybenzaldehyde. Reaction of compound II with, e.g., octynyllithium III gives the racemic alcohol of Formula IV. The alcohol of Formula IV is oxidized with Jones reagent to produce a ketone of Formula V, which is then reduced enantioselectively utilizing (R)-Alpine Borane according to the procedure of Midland (see M. M. Midland, D. C. McDowell, R. L. Hatch, and A. Tramontano, *J. Am Chem. Soc.* 1980], 102, (867–869)). This gives the enantiomerically enriched alcohol of Formula VI. The alcohol of Formula VI is treated with methanesulfonylchloride and lithium chloride to give the compound I (R'=n-decyl, R=n-octyl, X=chlorine). If the alcohol of Formula VI is treated with DAST, the compound of Formula I is formed in which R' is n-decyl, R is n-octyl and X is fluorine.

These procedures are illustrated by the following examples:

EXAMPLE I

This example illustrates the procedure for condensation of an aldehyde of Formula II with octynyllithium (the compound of Formula III).

A solution of n-butyllithium in hexane was added, over a period of 15 minutes, to a stirred and cooled solution of 1-octyne containing 3.1 ml (21.01 mmole) 1-octyne in 20 ml tetrahydrofuran (THF). The solution was cooled with a dry ice/isopropanol bath. The reaction mixture was stirred for an additional 30 minutes while cooled. Then 8 grams of a solution of a compound of Formula II (20.91 mmole) in 80 ml of THF was added to the stirred reaction mixture. After an additional 45 minutes, the reaction was quenched by addition of 10 ml of saturated aqueous ammonium chloride, and the mixture was allowed to warm to room temperature. Potassium carbonate was added to the reaction mixture until the aqueous layer became pasty, and then the organic layer was decanted from the aqueous paste. The paste was washed with three portions of ether, and the combined organic layers were dried, solvent was removed under vacuum, and the residue was recrystallized from toluene to give 8.4 grams (82% yield) of the alcohol of Formula IV as a white solid.

EXAMPLE II

This example illustrates the procedure for conversion of the alcohol of Formula IV to the ketone of Formula V.

8.4 grams of the alcohol of Formula IV (17.1 mmole) was dissolved in 175 ml of acetone and the solution was added to a 250 ml flask fitted with a stir bar and dropping funnel. 34 ml of Jones reagent was added dropwise to this solution. As soon as the reaction mixture became orange, the addition of the solution of Jones reagent was discontinued. The reaction mixture was stirred for a further 45 minutes. Then 2-propanol was added dropwise until the solution turned blue. 100 ml of water and 200 ml ether were added to the blue solution. The organic layer was separated and the aqueous layer was extracted with an additional 50 ml of ether. The combined organic layers were washed successively with 50 ml of water, two 50 ml portions of a 15% aqueous sodium hydroxide solution, 50 ml of water and 50 ml of brine. Then the solvent was removed under vacuum and the resulting crude product was recrystallized from 2-propanol to give 8 grams of the compound of Formula V as a white solid (95% yield).

EXAMPLE III

This example illustrates the procedure for enantioselective reduction of the ketone of Formula V to give the non-racemic alcohol of Formula VI.

4 grams of the ketone of Formula VI prepared according to Example II (8.15 mmole) was charged into a flame-dried 50 ml flask fitted with a stirrer bar. 32.6 ml of (R)-Alpine Borane (16.3 mmol) dissolved in THF was added to the ketone in the flask. The reaction mixture was stirred for three days at room temperature and then was cooled with an ice bath and quenched by the addition of 1 ml of acetaldehyde. The resulting mixture was allowed to stir for 15 minutes and then the volatile materials removed under vacuum. The residue was then treated with 16 ml of ether. The flask was cooled with an ice bath and 0.98 ml of ethanolamine (16.5 mmol) was added. Stirring was continued for 20 minutes, and then the mixture was allowed to warm to room temperature. The mixture was filtered to remove precipitated solids. The solids were washed with 20 ml of cold ether, and the combined filtrates were washed with 10 ml of brine and dried over anhydrous magnesium sulfate. The mixture was then filtered, solvent was removed under vacuum, and the resulting crude product was purified by flash chromatography on silica gel, eluting with 20% ethylacetate/hexane. Then the product was recrystallized from hexane to provide 3.2 grams of enantiomerically enriched alcohol of Formula VI as a white solid (78% yield).

EXAMPLE IV

This example illustrates the procedure for saturation of the triple bond of the alcohol of Formula VI to give the alcohol of Formula VII.

A thick-walled glass tube was fitted with a stirrer bar and charged with 1 gram of the alcohol of Formula VI produced by the procedure of Example III (2.0 mmole), 0.05 gram of 10% palladium on carbon, 4 ml of chloroform and 0.0002 gram of dimethylaminopyridine (DMAP). The resulting suspension was then put under a positive pressure of hydrogen (50 psi) and stirred rapidly. After one hour, the hydrogen pressure was released, and the reaction mixture was filtered through celite. The solvent was removed under vacuum to give a crude product which was purified by flash chromatography on silica gel, eluting with 18% ethyl acetate/hexane. The product was 0.85 grams of the alcohol of Formula VII as a white solid.

EXAMPLE V

This example illustrates the procedure for conversion of alcohols of Formula VII to Compounds of Formula I in which X is chlorine.

0.4 gram of the alcohol of Formula VII, produced by the procedure of Example IV, (0.8 mmol), 0.1 ml of 2,6-lutidine (0.86 mmol) and 0.04 gram of lithium chloride (0.94 mmol) were dissolved in 1.5 ml dimethylformamide (DMF). The solution was added to a 10 ml flask fitted with a stirrer bar and a septum. 0.07 ml of methanesulfonylchloride (0.9 mmol) was then added slowly via a syringe to the stirred solution. After 90 minutes, the reaction mixture was poured into 10 ml of ice water, and the resulting mixture was extracted with four 7 ml. portions of ether. The combined organic extracts were washed twice with 5 ml portions of saturated copper nitrate solution and then with 5 ml of water. The organic layer was dried over sodium sulfate and potassium carbonate, filtered, and then solvent was removed under vacuum. The resulting crude product was purified by flash chromatography, eluting with 8% ethyl acetate in hexane, to give 0.31 gram of a compound according to the present invention in which R' is n-decyl, R is n-octyl and X is chlorine (76% yield). This material was further purified by successive crystallizations from hexane and acetonitrile to provide the product whose properties are described below.

EXAMPLE VI

This example illustrates the procedure for conversion of alcohols of Formula VII to compounds of Formula I in which X is fluorine.

0.12 ml of DAST (0.91 mmol) was dissolved in dichloromethane, and the solution was charged into a flame dried 10 ml flask fitted with a stirrer bar and a septum. The flask was cooled with a dry ice/acetone bath. Then a solution of the compound of Formula VII prepared according to Example IV was added to the flask. After 20 minutes of stirring, the reaction mixture was allowed to warm to room temperature. Then the mixture was quenched by adding 5 ml of water. The organic layer was separated, and the solvent was removed under vacuum. The resulting crude product was purified by flash chromatography, eluting with 7% ethyl acetate/hexane. The product was then separately recrystallized from hexane, ether and then acetonitrile to give 0.35 gram of the compound of Formula I in which X is fluorine (80% yield), with the properties given below.

Table I gives the phase transition temperatures for two compounds having the structure given in Formula I, in which the groups R, R' and X are as stated in the table. In Table I, the first set of numbers give the transition temperatures (in degrees Centigrade) observed upon heating of the crystalline phase, and the second gives the phases and transition temperatures observed upon cooling of the isotropic liquid (phase transition temperatures are given in degrees Centigrade; I=isotropic liquid, A=smectic A phase, and X=crystalline solid).

TABLE I

| Compounds I | | |
|---|---|---|
| R = n-octyl, R' = n-decyl, X = Cl | | |
| X | 55 | I |
| I | 52 | X |
| R = n-octyl, R' = n-decyl, X = F | | |
| X | 69 | I |
| I | 62.8 A | 61.6 X |

As shown in Table I, neither of the new liquid crystal materials possesses an enantiotropic or monotropic ferroelectric (chiral smectic C*) liquid crystal phase. However, ferroelectric liquid crystal materials used in devices are normally mixtures of two or more component compounds. Mixing of liquid crystal materials often broadens the temperature range of the liquid crystal phases. Also, mixing of materials with the type of liquid crystal phases exhibited by the compounds of Formula I with ferroelectric liquid crystals is known to often produce mixtures with enantiotropic or monotropic ferroelectric smectic C* phases. An important advantage of the present invention in the context of ferroelectric liquid crystal mixtures is demonstrated as follows:

The compound according to Formula VIII is known to possess an enantiotropic ferroelectric C* phase, but very low dipole density (on the order of 1 nC/cm$^2$), and a very slow electro-optic switching speed (on the order of 3 msec in a 1 micrometer thick layer in SSFLC geometry with a 15 V/micrometer driving voltage).

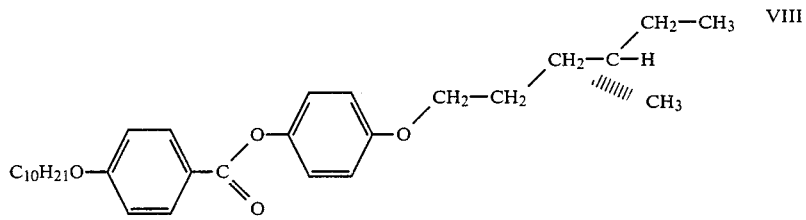

When a mixture is prepared with 1 part of the Compound of Formula I (R=n-octyl, R'=n-decyl, X=Cl) and 1 part of the compound of Formula VIII, a new composition is obtained which exhibits the phase given in Table II.

TABLE II

| Observed phases for the mixture of 1 part compound VIII and 1 part compound I (R = n-octyl, R' = n-decyl, X = Cl) upon cooling of the isotropic liquid | | | | | | | |
|---|---|---|---|---|---|---|---|
| I | 50 | A | 44.8 | C* | 34.7 | X | |

This mixture also was found to possess a positive ferroelectric polarization and electro-optic rise times in the SSFLC geometry of 12.3 microseconds at 40° C., 23 microseconds. at 38° C. and 33 microseconds at 35° C. in a one micrometer thick layer with a 15 V/micrometer driving voltage.

When a mixture containing 1 part of the compound of Formula I (R=n-octyl, R'=n-decyl, X=F) and 1 part of the compound of Formula VIII is prepared, a new composition exhibiting the phases shown in Table III is obtained. In the Table, the first set of numoers shows the transition temperatures (in degrees centigrade) observed upon heating of the crystalline phase, and the second shows the phases and transition temperatures observed upon cooling of the isotropic liquid (phase transition temperatures are given in degrees Centigrade; I=isotropic liquid, N*=chiral nematic phase, A=smectic A phase, S$_3$=an unidentified smectic phase, and X=crystalline solid).

TABLE III

| Observed phases for the mixture of 1 part compound VIII and 1 part compound I (R = n-octyl, R' = n-decyl, X = F) | | | | | | | | | |
|---|---|---|---|---|---|---|---|---|---|
| X | 42 | S$_3$ | 48 | C* | 67 | A | 70 | N* | 75 | I |
| I | 74 | N* | 70 | A | 63.8 | C* | 37.8 | S$_3$ | <0 | X |

This mixture also was found to possess a positive ferroelectric polarization of about +20 nC/cm$^2$ at 38° C., and electro-optic rise times in the SSFLC geometry of 27 microseconds at 59° C., 32 microseconds at 57° C., 36 microseconds at 54° C. and 43 microseconds at 38° C. in a one micrometer thick layer with a 15 V/micrometer driving voltage.

Thus, the compounds of Formula I are able to induce a high polarization upon mixing in a C* phase. This property is useful in components of ferroelectric liquid crystal phases, and comprises and demonstrates some of the advantages of the present invention.

Either enantiomer of any of the described chiral compounds can be readily obtained by following the procedure of Midland described above, allowing the sign of polarization to be adjusted easily to optimize the ferroelectric dipole density of mixtures incorporating these compounds.

The invention has been described by reference to preferred embodiments, but it is not intended to limit the invention by doing so. For example, while the asymmetrical liquid crystal compounds have been defined in their pure state, the invention encompasses liquid crystal formulations in which the compounds of Formula I are used in admixture with one another and/or in formulations in which a compound of Formula I is used in admixture with other compounds, including other liquid crystal compounds. Furthermore, while only a single enantiomer of each chirally asymmetrical compound has been prepared, the present invention is meant to encompass both enantiomers of each compound. Therefore, it is intended that scope of the present inven-

What is claimed is:

1. A compound of the formula:

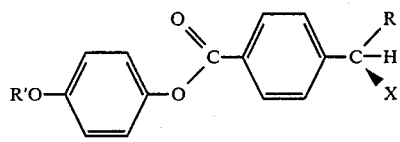

wherein R is an alkyl group containing three to twelve carbon atoms, R' is an alkyl group containing five to twelve carbon atoms and X is selected from the group consisting of chlorine and fluorine.

2. A compound according to claim 1 in which X is chlorine.

3. A compound according to claim 1 in which X is fluorine.

4. A compound according to claim 1, claim 2, or claim 3 in which R is n-octyl.

5. The compound of claim 4 in which R' contains 10 carbon atoms.

6. The compound of claim 5 wherein R' is n-decyl.

* * * * *